US012611857B2

(12) United States Patent
Cheng

(10) Patent No.: US 12,611,857 B2
(45) Date of Patent: Apr. 28, 2026

(54) STENCIL PRINTING MACHINE AND ALIGNMENT METHOD

(71) Applicant: Illinois Tool Works Inc., Glenview, IL (US)

(72) Inventor: Zaizai Cheng, Glenview (CN)

(73) Assignee: Illinois Tool Works Inc., Glenview, IL (US)

( * ) Notice: Subject to any disclaimer, the term of this patent is extended or adjusted under 35 U.S.C. 154(b) by 68 days.

(21) Appl. No.: 18/630,120

(22) Filed: Apr. 9, 2024

(65) Prior Publication Data

US 2024/0336055 A1 Oct. 10, 2024

(30) Foreign Application Priority Data

Apr. 10, 2023 (CN) ......................... 202310375598.1
Apr. 3, 2024 (CN) ......................... 202410404624.3

(51) Int. Cl.
*B41F 15/08* (2006.01)
*B41F 15/44* (2006.01)

(52) U.S. Cl.
CPC .......... *B41F 15/0818* (2013.01); *B41F 15/44* (2013.01); *B41P 2215/112* (2013.01)

(58) Field of Classification Search
CPC .. B41F 15/0818; B41F 15/44; B41P 2215/112
See application file for complete search history.

(56) References Cited

U.S. PATENT DOCUMENTS

2009/0205518 A1* 8/2009 Doyle ..................... B41F 15/36 101/124
2014/0047990 A1 2/2014 Fujii
2018/0215137 A1* 8/2018 Yamamoto .............. B41F 15/34

FOREIGN PATENT DOCUMENTS

| | | | |
|---|---|---|---|
| GB | 2489539 A | | 10/2012 |
| JP | H0516328 A | * | 1/1993 |
| JP | H06942 | * | 1/1994 |
| JP | H06942 A | | 1/1994 |

* cited by examiner

*Primary Examiner* — Christopher E Mahoney
*Assistant Examiner* — Marissa Ferguson-Samreth
(74) *Attorney, Agent, or Firm* — Lando & Anastasi, LLP

(57) ABSTRACT

The present disclosure provides a stencil printer for printing a viscous substance onto a substrate. The stencil printer comprises a frame, a stencil, a support table, a squeegee blade mount, a squeegee blade and a squeegee blade holder. The stencil is connected to the frame. The support table is connected to the frame and configured to support the substrate in a printing position. The support table is provided below the stencil. The squeegee blade mount is connected to the frame and provided above the stencil. The squeegee blade extends in an X direction and performing a squeegeeing operation in a Y direction perpendicular to the X direction. The squeegee blade holder comprises a fixed holder and a movable holder. The fixed holder is fixedly mounted to the squeegee blade mount, and the squeegee blade is held on the movable holder. The movable holder is configured to be movably connected to the fixed holder in the X direction to enable the squeegee blade to move relative to the support table in the X direction, so that the squeegee blade is adjustable in the X direction to a position aligned with the support table and the stencil.

11 Claims, 5 Drawing Sheets

STENCIL PRINTING MACHINE AND ALIGNMENT METHOD

CROSS-REFERENCE TO RELATED APPLICATIONS

This is a U.S. Utility Applications which claims priority to Chinese Patent Application No. 2024104046243 filed Apr. 3, 2024, and Chinese Patent Application No. 2023103755981, filed on Apr. 10, 2023; the entire contents of each of the foregoing applications is hereby incorporated by reference.

TECHNICAL FIELD

The present disclosure generally relates to a stencil printer for printing a viscous substance onto a substrate, and a method for aligning a squeegee, a stencil and a substrate of the stencil printer. The viscous substance may be solder paste, for example, and the substrate may be a printed circuit board, for example.

BACKGROUND

In a typical circuit board production process, a stencil printer is used to print solder paste onto a printed circuit board. A circuit board, broadly referred to as an electronic substrate, having a pattern of pads or some other conductive surfaces onto which solder paste can be deposited, is automatically fed into the stencil printer. Small holes or marks on the circuit board, called fiducials, are used to align the circuit board with the stencil or screen of the stencil printer prior to the printing of solder paste onto the circuit board. The fiducials serve as reference points when aligning a circuit board with the stencil. Once a circuit board has been aligned with the stencil of the printer, the circuit board is raised to the stencil by a substrate support, and fixed with respect to the stencil. The stencil support may be a table having pins or other object supporters, for example. Solder paste is then dispensed by moving a wiper blade or scraper across the stencil to force the solder paste through holes formed in the stencil and onto the circuit board. The solder paste is typically dispensed onto the stencil from a standard solder paste supply cartridge. After the printing operation is completed, the circuit board is released, lowered away from the stencil, and then conveyed to another position within the printed circuit board production line.

One type of substrate has protrusions and recesses on its printing surface so that its printing surface is non-flat. In a stencil printer that prints solder paste onto such a substrate, a stencil is used that has a three-dimensional screen whose shape matches the shape of the printing surface of the substrate. By using a three-dimensional screen, the solder paste can be printed on both the protrusions and recesses on the printing surface of the substrate.

SUMMARY OF THE DISCLOSURE

According to a first aspect of the present disclosure, the present disclosure provides a stencil printer for printing a viscous substance onto a substrate. The stencil printer comprises a frame, a stencil, a support table, a squeegee blade mount, a squeegee blade and a squeegee blade holder. The stencil is connected to the frame. The support table is connected to the frame and configured to support the substrate in a printing position. The support table is provided below the stencil. The squeegee blade mount is connected to the frame and provided above the stencil. The squeegee blade extends in an X direction and performing a squeegeeing operation in a Y direction perpendicular to the X direction. The squeegee blade holder comprises a fixed holder and a movable holder. The fixed holder is fixedly mounted to the squeegee blade mount, and the squeegee blade is held on the movable holder. The movable holder is configured to be movably connected to the fixed holder in the X direction to enable the squeegee blade to move relative to the support table in the X direction, so that the squeegee blade is adjustable in the X direction to a position aligned with the support table and the stencil.

The stencil printer according to the first aspect further comprises an adjusting means mounted to the fixed holder and configured to drive the movable holder to move relative to the fixed holder in a first movement direction and in a second movement direction opposite to the first movement direction. The first movement direction and the second movement direction are in the X direction.

In the stencil printer according to the first aspect, the adjusting means comprises a driving member and a restoring member. The driving member comprises a handle and a push rod connected to the handle. The push rod abuts against the movable holder, and the driving member is configured to drive the push rod to move in the first movement direction relative to the fixed holder by operation of the handle, so as to push the movable holder to move in the first movement direction relative to the fixed holder. The restoring member is clamped between the movable holder and the fixed holder. The restoring member is configured to accumulate a restoring force during the movement of the movable holder in the first movement direction, and to drive the movable holder to move in the second movement direction by means of the restoring force.

In the stencil printer according to the first aspect, the driving member is threadedly connected to the fixed holder via the push rod.

In the stencil printer according to the first aspect, the driving member and the fixed holder are provided with measuring features capable of measuring a movement distance of the push rod.

In the stencil printer according to the first aspect, the fixed holder comprises a fixed holder body and a first support block and a second support block which are respectively provided at two opposite ends of the top of the fixed holder body, and the movable holder comprises a movable holder body and a first retaining arm and a second retaining arm which are respectively provided at two opposite ends of the movable holder body. The driving member is mounted to the first support block and abuts against the first retaining arm, and the restoring member is clamped between the second support block and the second retaining arm.

In the stencil printer according to the first aspect, the first support block comprises a first support block body and a connecting cylinder. The connecting cylinder is provided on a side of the first support block body away from the second support block, and the push rod of the driving member is threadedly connected to the connecting cylinder and passes through the first support block body.

In the stencil printer according to the first aspect, the restoring member is a spring.

In the stencil printer according to the first aspect, the fixed holder is provided with at least one connecting groove extending in the X direction, and the movable holder is connected to the fixed holder via at least one fastener passing through the at least one connecting groove, wherein the at least one fastener is movable in the X direction along the at least one connecting groove.

In the stencil printer according to the first aspect, the fixed holder is provided with a fixed holder alignment reference feature, the movable holder is provided with a movable holder alignment reference feature, and a position of the fixed holder alignment reference feature and the movable holder alignment reference feature relative to each other determines an offset of the fixed holder and the movable holder relative to each other.

In the stencil printer according to the first aspect, the squeegee blade mount is provided with a squeegee blade mount alignment structure, the fixed holder is provided with a fixed holder alignment structure, and the squeegee blade mount alignment structure cooperates with the fixed holder alignment structure to align the squeegee blade mount with the fixed holder.

According to a second aspect of the present disclosure, the present disclosure provides an alignment method for a stencil printer for aligning the squeegee blade, the stencil and the substrate according to the first aspect. The method comprises the steps as follows: S1, determining an offset $\Delta X_1$ of the squeegee blade mount relative to the support table in the X direction; S2, mounting the fixed holder to the squeegee blade mount after aligning the fixed holder with the squeegee blade mount, and offsetting the fixed holder relative to the movable holder in the X direction by $\Delta X_1$ to initially align the squeegee blade with the support table; S3, loading the substrate onto the support table at a predetermined position at which the substrate is aligned with the support table; S4, moving the support table to align the support table with the stencil, wherein the support table is moved by a distance of $\Delta X_2$ in the X direction; and S5, moving the movable holder in the X direction relative to the fixed holder by $\Delta X_2$ to finally align the squeegee blade with the support table and the stencil.

In the alignment method according to the second aspect, the step S3 may precede the step S1 or S2.

DETAILED DESCRIPTION OF EMBODIMENTS

Various specific implementations of the present disclosure will be described below with reference to the accompanying drawings which form a part of this specification. It should be understood that although the terms indicating directions, such as “front”, “rear”, “upper”, “lower”, “left”, “right”, “top”, and “bottom” are used in the present disclosure to describe structural parts and elements in various examples of the present disclosure, these terms are used herein only for ease of illustration and are determined based on the exemplary orientations shown in the accompanying drawings. Since the arrangements in the embodiments disclosed in the present disclosure may be in various directions, these terms indicating directions are merely illustrative and should not be considered as limitations.

Figure 1:
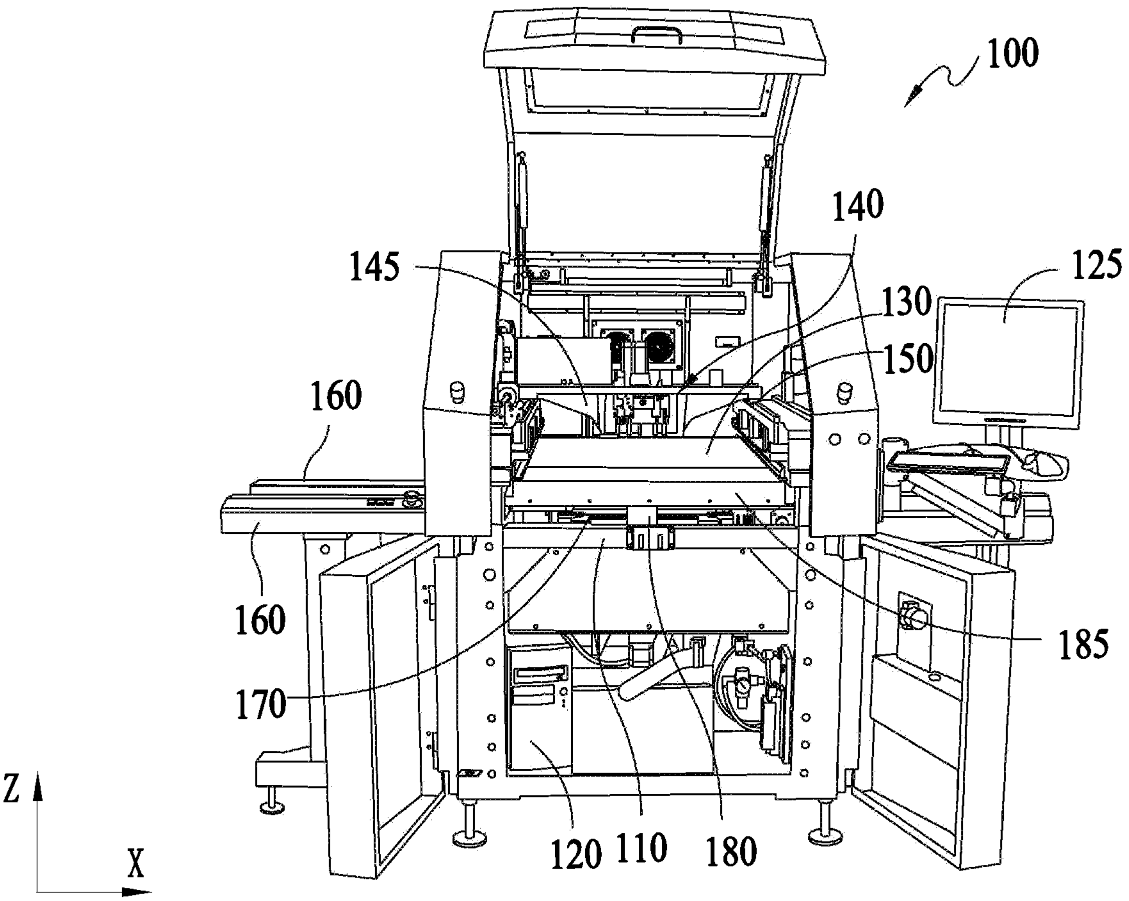
FIG. 1 is a perspective view of a stencil printer according to an embodiment of the present disclosure.

FIG. 1 is a perspective view of a stencil printer 100 according to an embodiment of the present disclosure. As shown in FIG. 1, the stencil printer 100 comprises a frame 110 that supports various components of the stencil printer. The components of the stencil printer 100 comprise a controller 120, a display 125, a stencil 130, and a squeegee means 140 for applying solder paste. The stencil 130 and the squeegee means 140 may be suitably coupled to the frame 110. In an embodiment, the squeegee means 140 may be mounted to a squeegee means gantry 150. The squeegee means gantry 150 may be mounted to the frame 110. Under the control of the controller 140, the gantry 150 can move the squeegee means 140 in a Y-axis direction perpendicular to an X-axis and a Z-axis. The squeegee means 140 may be placed above the stencil 130, and the squeegee means 140 may comprise two squeegee assemblies (e.g., the squeegee assemblies 240 in FIG. 2), each squeegee assembly comprising one squeegee blade. The squeegee blade of the squeegee means 140 may be lowered in the Z-axis direction into contact with the stencil 130. The squeegee blade of the squeegee means 140 then may be moved across the stencil 130 by means of the gantry 150, to allow printing of the solder paste onto a circuit board.

The stencil printer 100 may further comprise a conveyor system which comprises rails 160 and which is used to convey a printed circuit board (sometimes referred to as “printed wiring board”, “substrate” or “electronic substrate”) to a printing position within the stencil printer 100. The rails 160, also referred to herein as a “feed mechanism”, is configured to provide, load, or convey the circuit board to and unload the circuit board from a work area of the stencil printer 100. The stencil printer 100 has a support table 170 to support the circuit board.

In some embodiments, the squeegee means 140 may be configured to obtain solder from a source such as a dispenser (e.g., a solder paste cartridge), which supplies solder paste to the squeegee means during a printing operation. Other methods of supplying solder paste may be employed in place of the solder paste cartridge. For example, the solder paste may be deposited manually between squeegee blades, or the solder paste may come from an external source. Additionally, in some embodiments, the controller 120 may be configured to control the operation of the stencil printer 100 using a personal computer having a Microsoft DOS or Windows XP operating system with application-specific software. The controller 120 may be networked with a master controller that is used to control a production line for manufacturing circuit boards.

In some embodiments, the stencil printer 100 operates as follows. A circuit board is fed into the stencil printer 100 in the X-axis direction by means of the conveyor rails 160. The support table 170 raises and secures the circuit board to the printing position. The squeegee means 140 then lowers the desired squeegee blade in the Z-axis direction until the squeegee blade contacts the stencil 130 at a desired pressure. The squeegee means 140 is then moved in the Y-axis direction across the stencil 130 by means of the squeegee means gantry 150. The squeegee means 140 deposits solder paste through holes in the stencil 130 and onto the circuit board. Once the squeegee means 140 has fully traversed the stencil 130, the squeegee is lifted off the stencil 130 and the circuit board is lowered back onto the conveyor rails 160. Subsequently, the circuit board is released and output from the stencil printer 100 so that a second circuit board may be loaded into the stencil printer 100. To print on the second circuit board, another squeegee is lowered along the Z-axis into contact with the stencil, and the squeegee means 140 is moved across the stencil 130 in the direction opposite to that used for the first circuit board.

Still referring to FIG. 1, an imaging system 180 may be provided for aligning the stencil 130 with the circuit board prior to printing and for inspecting the circuit board after printing. In an embodiment, the imaging system 180 may be arranged between the stencil 130 and the support table 170 on which the circuit board is supported. The imaging system 180 is connected to an imaging gantry 185 to move the imaging system. In an embodiment, the imaging gantry 185 may be connected to the frame 110, and the imaging gantry 185 comprises a beam extending between side rails of the frame 110 such that the imaging system 180 can move back and forth over the circuit board in the Y-axis direction. The imaging gantry 185 may further comprise a transport means, which surrounds the imaging system 180 and is configured to move along the length of the beam in the X-axis direction. The structure of the imaging gantry 185 used to move the imaging system 180 is well known in the art of solder paste printing. The scheme is such that the imaging system 180 may be located at any position below the stencil 130 and above the circuit board to acquire an image of a predetermined area of the circuit board or stencil, respectively.

In an embodiment, the squeegee means 140 comprises a frame member 145 that forms part of the gantry 150. The frame member 145 is configured to move along the printing direction, for example, the Y-axis direction. Specifically, the frame member 145 is configured at its two opposite ends to slide along linear rails (not shown in FIG. 1) of the frame 110 of the stencil printer 100. This structure enables the squeegee means gantry 150 to move in the Y-axis direction.

Figure 2:
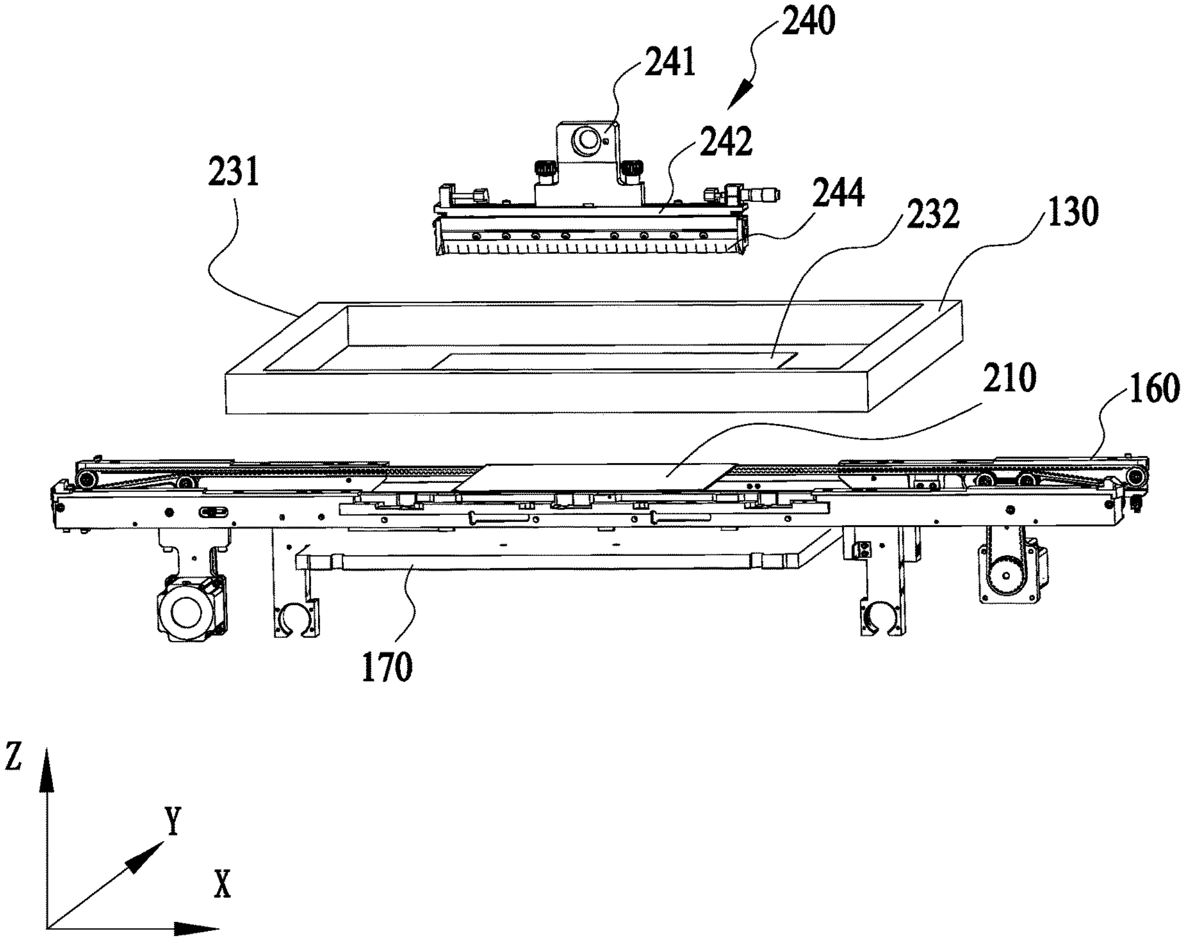
FIG. 2 is a perspective view of a squeegee assembly, a stencil and a support table in FIG. 1.

FIG. 2 is a perspective view of the squeegee assembly 240, the stencil 130 and the support table 170 in FIG. 1. FIG. 2 shows the relative positional relationship between the squeegee assembly 240, the stencil 130 and the support table 170. In addition, FIG. 2 also shows the rails 160, and the substrate 210 on the rails 160. As shown in FIG. 2, the squeegee assembly 240 is located above the stencil 130, and the support table 170 is located below the stencil 130. FIG. 2 also shows the substrate (or circuit board) 210 that has been conveyed by the rails 160 to a predetermined position on the support table 170, where the substrate 210 is aligned with the support table 170. The substrate 210 comprises an (uneven) non-flat printing surface (not shown). The stencil 130 comprises a border 231 and a three-dimensional screen 232. The border 231 is arranged around the three-dimensional screen 232, and the two are connected to each other. The shape (or pattern) of the three-dimensional screen 232 matches the shape (or pattern) of the printing surface of the substrate 210.

As still shown in FIG. 2, the squeegee assembly 240 comprises a squeegee blade mount 241, a squeegee blade holder 242 and a squeegee blade 244. The squeegee blade mount 241 is secured to the squeegee means gantry 150, and the squeegee blade holder 242 is connected to the squeegee blade mount 241 and used to hold the squeegee blade 244.

Figure 3A:
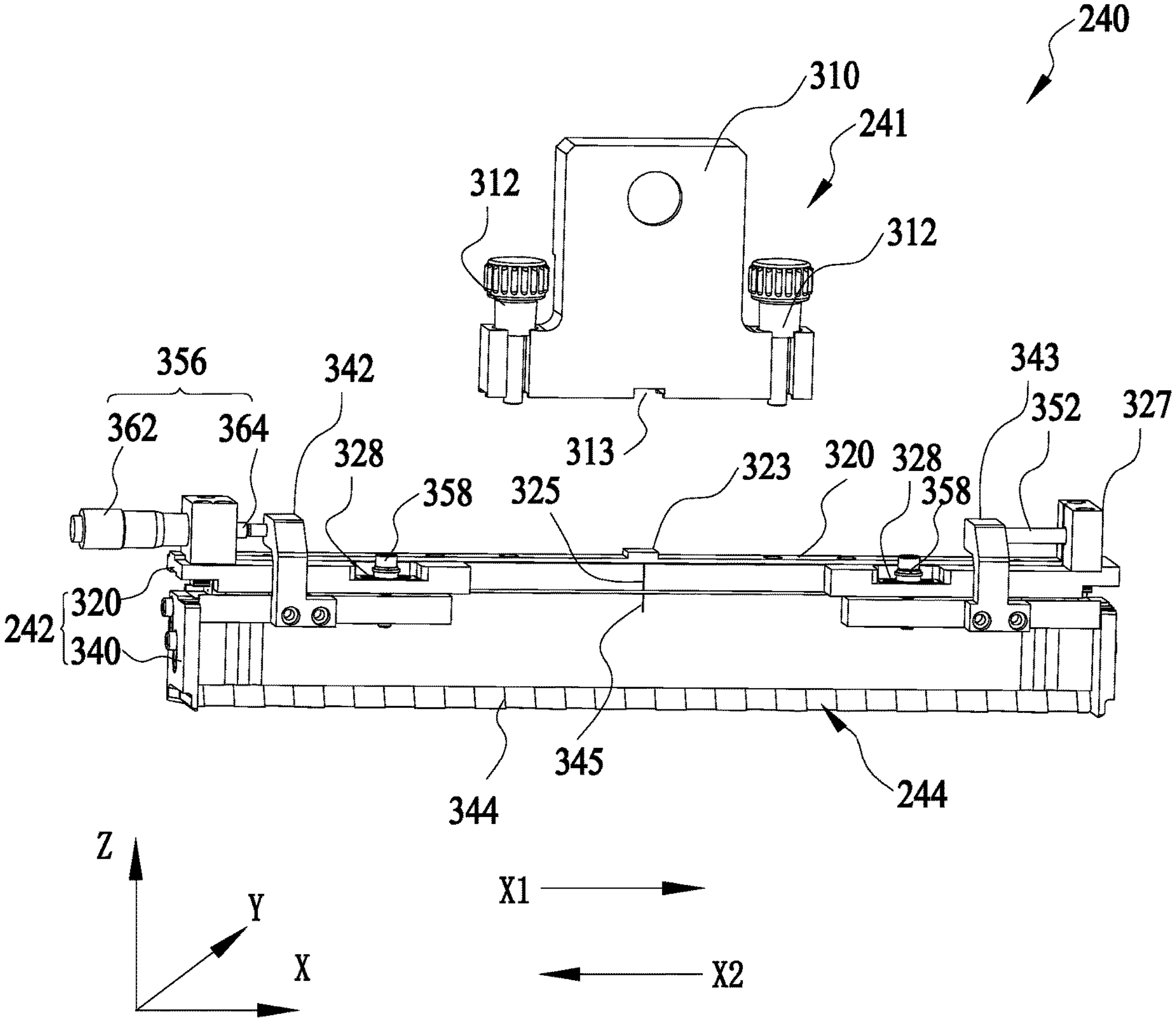
FIG. 3A is a partial exploded view of the squeegee assembly in FIG. 2.
Figure 3B:
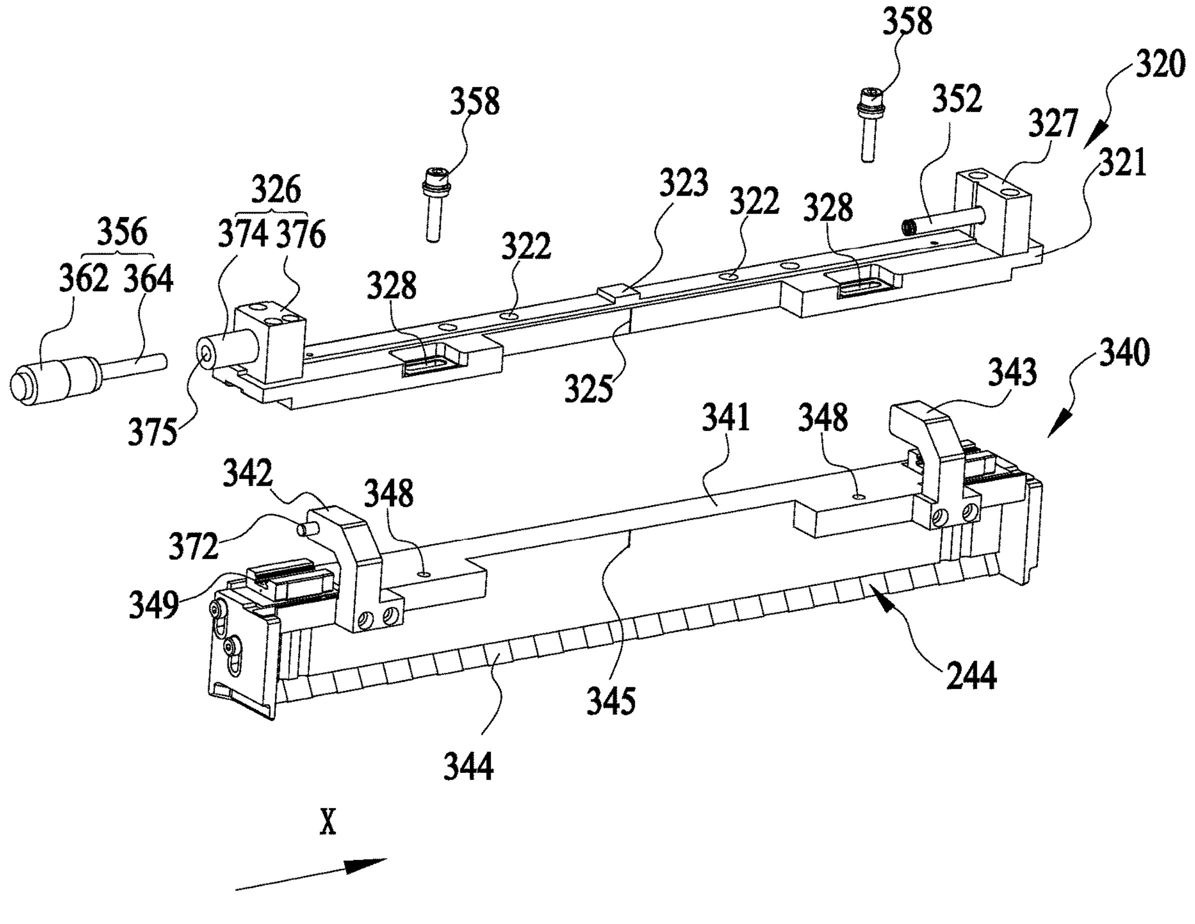
FIG. 3B is another partial exploded view of the squeegee assembly in FIG. 2.

FIGS. 3A and 3B are two partial exploded views of the squeegee assembly 240 in FIG. 2, for showing various components of the squeegee assembly 240 and their assembly relationships. In FIG. 3A, the squeegee blade mount 241 is separated from the squeegee blade holder 242, and the squeegee blade 244 is held on the squeegee blade holder 242. In FIG. 3B, two parts of the squeegee blade holder 242 are separated, and the squeegee blade mount 241 is not shown.

As shown in FIGS. 3A and 3B, the squeegee blade holder 242 comprises a fixed holder 320 and a movable holder 340, and the squeegee blade 244 is held in the movable holder 340, exposing only an edge portion 344 at a bottom end thereof. Therefore, the position of the movable holder 340 determines the position of the squeegee blade 244, and the position of the squeegee blade 244 relative to the squeegee blade mount 241 and the support table 170 is adjusted by adjusting the position of the movable holder 340.

The squeegee blade 244 squeegees the solder paste on the three-dimensional screen 232 of the stencil 130 with its edge portion 344, so that the solder paste is deposited on the substrate 210 through holes in the three-dimensional screen 232. The edge portion 344 is complementary in shape to the three-dimensional screen 232 to allow the squeegee blade 244 to perform a uniform squeegeeing operation on the protrusions and recesses on the three-dimensional screen 232 in a single stroke. When the squeegee blade 244, the stencil 130 and the substrate 210 are aligned with one another, corresponding to the same printing position on the substrate 210, the edge portion 344 of the squeegee blade 244 is complementary in shape to the three-dimensional screen 232. For example, a protrusion of the edge portion 344 is aligned with a recess of the three-dimensional screen 232. When the squeegee blade 244 is mounted in place in the stencil printer 100, the squeegee blade 244 extends in the X direction of the stencil printer 100 and moves in the Y direction of the stencil printer 100 to perform the squeegeeing operation.

As shown in FIG. 3B, the fixed holder 320 comprises a generally elongated fixed holder body 321, and the fixed holder 320 is secured to the squeegee blade mount 241 via the fixed holder body 321. The squeegee blade mount 241 is provided with a squeegee blade mount alignment structure 313 (as shown in FIG. 3A), and the fixed holder body 321 is provided with a fixed holder alignment structure 323. The fixed holder alignment structure 323 is in a form fit with the squeegee blade mount alignment structure 313, and the fixed holder body 321 can be aligned with the squeegee blade mount 241 by inserting the fixed holder alignment structure 323 into the squeegee blade mount alignment structure 313. The fixed holder body 321 is then secured to the squeegee blade mount 241 via a pair of mounting bolts 312 (as shown in FIG. 3A). To this end, the fixed holder body 321 is provided with mounting holes 322 in the top thereof for receiving the mounting bolts 312. In the embodiment shown in the figure, the squeegee blade mount alignment structure 313 is a notch, while the fixed holder alignment structure 323 is a protrusion. In other embodiments, the squeegee blade mount alignment structure 313 and the fixed holder alignment structure 323 may alternatively have other structures.

The fixed holder body 321 is provided with a fixed holder alignment reference feature 325 on a front side thereof for serving as a reference when adjusting the position of the movable holder 340 in the X direction. The fixed holder alignment reference feature 325 is provided generally centrally on the front side of the fixed holder body 321 in the X direction. The fixed holder 320 further comprises a first support block 326 and a second support block 327 respectively provided at two opposite ends of the top of the fixed holder body 321. The first support block 326 comprises a first support block body 376 and a connecting cylinder 374. The connecting cylinder 374 is connected to a side of the first support block 326 away from the second support block 327, and the connecting cylinder 374 is received in a through hole (not shown) of the first support block 326. The connecting cylinder 374 has a hole 375. In the embodiment shown in the figure, the fixed holder alignment reference feature 325 is a reference line extending in the Z direction. In other embodiments, the fixed holder alignment reference feature 325 may alternatively be other features, such as a reference point.

As still shown in FIGS. 3A and 3B, the movable holder 340 comprises a generally elongated movable holder body 341. The movable holder 340 is movably connected to the fixed holder 320 via the movable holder body 341 in a length direction of the squeegee blade 244 (the length direction of the squeegee blade 244 is in the X direction when the squeegee assembly 240 is mounted in place in the stencil printer 100). The movable holder body 341 is provided with a movable holder alignment reference feature 345 on a front side thereof for cooperating with the fixed holder alignment reference feature 325 of the fixed holder 320 when adjusting the position of the movable holder 340 in the X direction, so as to determine an offset of the movable holder 340 relative to the fixed holder 320. The movable holder alignment reference feature 345 is provided generally centrally on the front side of the movable holder body 341 in the X direction. In the embodiment shown in the figure, the movable holder alignment reference feature 345 is a reference line extending in the Z direction. In other embodiments, the movable holder alignment reference feature 345 may alternatively be other features, such as a reference point.

The connection between the movable holder 340 and the fixed holder 320 is implemented by means of a fastener 358, a connecting groove 328 provided on the fixed holder body 321, and a receiving hole 348 provided in the movable holder body 341. The connecting groove 328 extends a predetermined distance in an extension direction (X direction) of the squeegee blade 244, and the distance reflects the predetermined movement distance of the movable holder 340 in the X direction. The fastener 358 passes through the connecting groove 328 from above the fixed holder 320 and enters the receiving hole 348 of the movable holder 340, and can move in the connecting groove 328 in an extension direction of the connecting groove 328. There is a pair of connecting grooves 328, which are provided on two opposite sides of the fixed holder alignment reference feature 325 of the fixed holder 320. Correspondingly, there is also a pair of receiving holes 348, which are provided on two opposite sides of the movable holder alignment reference feature 345 of the movable holder 340. The receiving hole 348 may be configured as a threaded hole for threaded connection with the fastener 358. In other embodiments, one connecting groove 328, one fastener 358, and one receiving hole 348 may alternatively be provided.

The movable holder 340 further comprises a guide groove 349 provided on the top of the movable holder body 341 for mating with a guide bar (not shown) provided on the bottom of the fixed holder body 241, so that the movable holder 340 moves more smoothly in the X direction relative to the fixed holder 320. The movable holder 340 further comprises a first retaining arm 342 and a second retaining arm 343 respectively arranged at two opposite ends of the top of the movable holder body 341. The first retaining arm 342 and the second retaining arm 343 form cantilevers extending upwardly from the movable holder body 341, with free ends thereof extending above the fixed holder 320. A pushed rod 372 is provided on a side of the first retaining arm 342 away from the second retaining arm 343.

The squeegee assembly 240 of the present disclosure further comprises an adjusting means for adjusting the relative position between the movable holder 340 and the fixed holder 320 in the X direction, so that the squeegee blade 244 can be adjusted to a position aligned with the support table 170. In addition, the adjusting means can also maintain the squeegee blade 244 in the position aligned with the support table 170.

As shown in FIGS. 3A and 3B, the adjusting means comprises a driving member 356 and a restoring member 352. The driving member 356 drives the movable holder 340 together with the squeegee blade 244 to move in a first movement direction X1 relative to the fixed holder 240. The driving member 356 has a handle 362 and a push rod 364. The handle 362 is connected to the push rod 364. The push rod 364 is movably supported on the first support block 326 of the fixed holder 240. The push rod 364 passes through the connecting cylinder 374 and the first support block body 376 to abut against the first retaining arm 342 of the movable holder 340 (see FIG. 3A), so as to push the movable holder 340 and the squeegee blade 244 to move in the first movement direction X1 by means of the first retaining arm 342. The restoring member 352 is clamped between the second retaining arm 343 of the movable holder 340 and the second support block 327 of the fixed holder 320. The restoring member 352 accumulates a restoring force during the movement of the movable holder 340 in the first movement direction X1, and drives the movable holder 340 to move in a second movement direction X2 by means of the restoring force. The first movement direction X1 and the second movement direction X2 are opposite directions in the X direction. In an embodiment, the restoring member 352 is a spring. In other embodiments, the restoring member 352 can alternatively be other elastic components.

The handle 362 of the driving member 356 is in the shape of a sleeve, and the push rod 364 of the driving member 356 is threadedly connected (not shown) to the connecting cylinder 374 of the first support block 326. Therefore, when an operator twists the handle 362 of the driving member 356, the handle 362 of the driving member 356 can rotate relative to the connecting cylinder 374. When it is required to move the movable holder 340 in the first movement direction X1, the operator twists the handle 362 of the driving member 356 to rotate in a first rotation direction, so as to drive the push rod 364 to move in the first movement direction X1, that is, to move the push rod 364 forward. The forward movement of the push rod 364 pushes the movable holder 340 to move in the first movement direction X1. During the movement of the movable holder 340 in the first movement direction X1, the restoring member 352 is compressed to accumulate the restoring force. When it is required to move the movable holder 340 in the second movement direction X2, the operator twists the handle 362 of the driving member 356 to rotate in a second rotation direction opposite to the first rotation direction, so as to drive the push rod 364 to move in the second movement direction X2, that is, to move the push rod 364 backward. The backward movement of the push rod 364 enables the restoring member 352 to push the movable holder 340 to move in the second movement direction X2 by means of its restoring force.

The handle 362 of the driving member 356 and the connecting cylinder 374 of the first support block 326 are provided with measuring features (not shown) for measuring a movement distance of the push rod 364. For example, the handle 362 of the driving member 356 is provided with an angle scale that can indicate a rotation angle of the handle 362 relative to the connecting cylinder 374, and the connecting cylinder 374 of the first support block 326 is provided with a length scale that can indicate the movement distance of the push rod. The rotation angle of the handle 362 determines the movement distance of the push rod. As an example, the driving member 356 and the connecting cylinder 374 of the first support block 326 together form an assembly similar to a micrometer, and by controlling the number of turns of the handle 362 of the driving member 356, the movement distance of its push rod 364 in the X direction can be controlled, so that it is possible to finely adjust the distance by which the squeegee blade 244 moves in the X direction relative to the fixed holder 240.

It should be noted that, although in the illustrated embodiment, the adjusting means comprises a driving member and a restoring member, in other embodiments, the adjusting means may alternatively be other types of means, as long as it can drive the movable holder 340 to move by a predetermined distance in the first movement direction X1 and in the second movement direction X2.

The present disclosure also provides a method for aligning the squeegee blade 244, the stencil 130 and the substrate 210 (or the support table 170). According to an embodiment of the stencil printer 100 of the present disclosure, the squeegee blade mount 241 is immovable in the X direction. In addition, after the substrate 210 is loaded onto the support table 170 at a predetermined position, the substrate 210 and the support table 170 are automatically aligned with each other. Therefore, when the squeegee blade 244 is aligned with the support table 170, the squeegee blade 244 is also aligned with the substrate 210.

Figure 4:
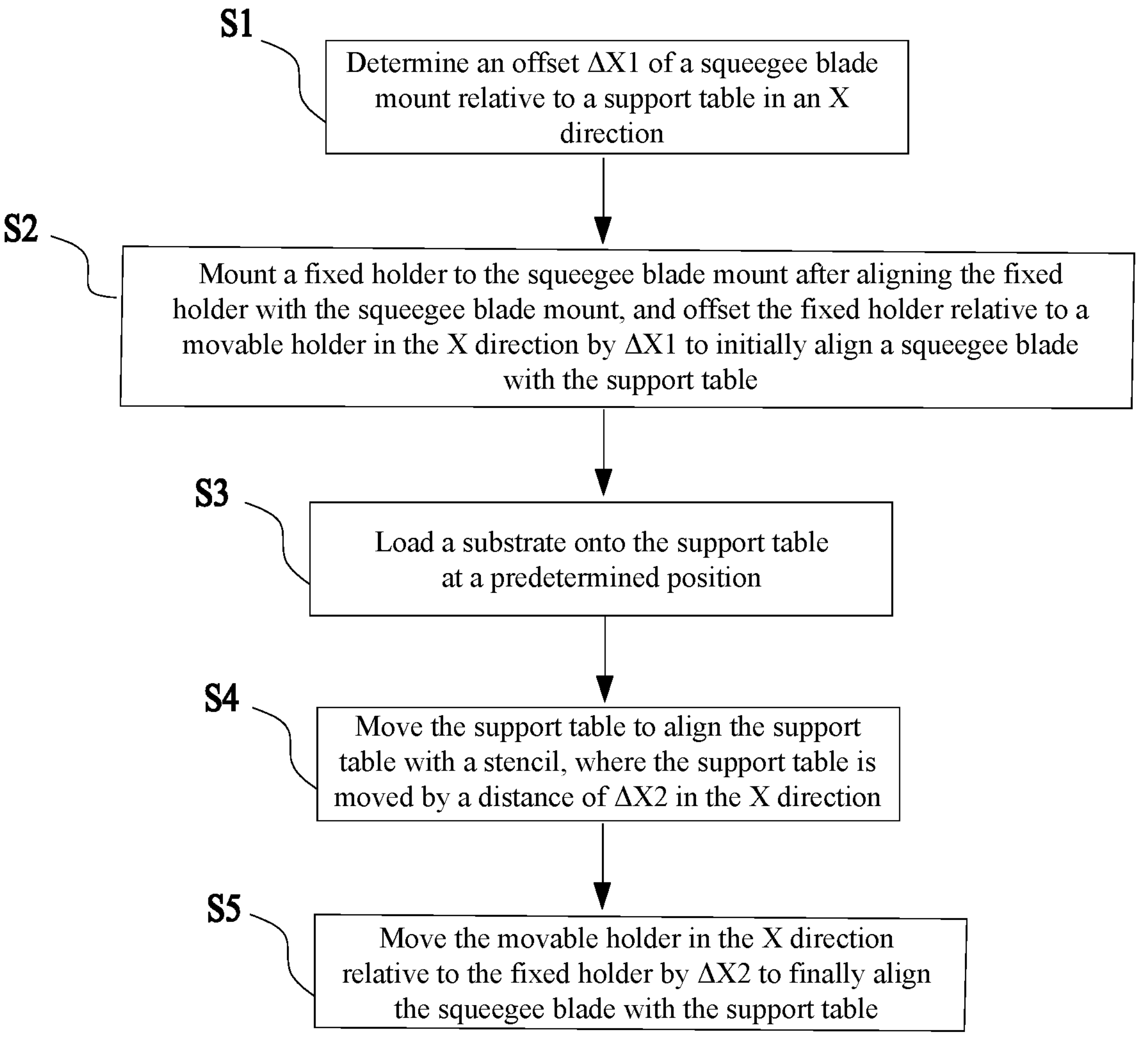
FIG. 4 shows an alignment method for a stencil printer according to an embodiment of the present disclosure.

FIG. 4 shows an alignment method for a stencil printer according to an embodiment of the present disclosure. The control method shown in FIG. 4 is stored in the controller 120, and the controller 120 controls relevant components to execute the method.

As shown in FIG. 4, the method for aligning the squeegee blade 244, the stencil 130 and the substrate 210 comprises the following steps.

In step S1, before mounting the squeegee blade 244, an offset AX1 of the squeegee blade mount 241 relative to the support table 170 in the X direction is determined.

In step S2, after aligning the fixed holder 320 with the squeegee blade mount 241, the fixed holder 320 is mounted to the squeegee blade mount 241, and the fixed holder 320 is offset relative to the movable holder 340 in the X direction by $\Delta X_1$ to initially align the squeegee blade 244 with the support table 170.

In step S3, the substrate 210 is loaded onto the support table 170 at a predetermined position. At this predetermined position, the substrate 210 is aligned with the support table 170.

In step S4, the support table 170 is moved in the X direction to align the support table 170 with the stencil 130, where the support table 170 is moved by a distance of $\Delta X_2$ in the X direction.

In step S5, the movable holder 340 is moved together with the squeegee blade 244 in the X direction relative to the fixed holder 240 by $\Delta X_2$ to finally align the squeegee blade 244 with the support table 170.

After step S5 is completed, the squeegee blade 244, the stencil 130 and the substrate 210 are aligned with one another, and the next operation can be performed, such as lowering the squeegee blade 244 to perform a scraping operation.

Among the above steps, step S3 may be performed before step S1 or S2.

For the above step S1, the offset $\Delta X_1$ of the squeegee blade mount 241 relative to the support table 170 in the X direction may be determined through various methods. In an embodiment, the squeegee blade mount 241 and the rails 160 secured to the support table 170 are respectively provided with two calibration points, and the offset between each calibration point on the squeegee blade mount 241 and a corresponding calibration point on the rails 160 in the X direction is then identified to determine the offset AX1 of the squeegee blade mount 241 relative to the support table 170 in the X direction.

In the above step S2, the fixed holder 320 may be offset relative to the movable holder 340 in the X direction by $\Delta X_1$ before the fixed holder 320 and the movable holder 340 are mounted to the squeegee blade mount 241. It is also possible that the fixed holder 320 is offset relative to the movable holder 340 in the X direction by AX1 after the fixed holder 320 and the movable holder 340 are mounted to the squeegee blade mount 241.

For the above step S2, offsetting the fixed holder 320 relative to the movable holder 340 in the X direction by $\Delta X_1$ is implemented by offsetting the fixed holder alignment reference feature 325 relative to the movable holder alignment reference feature 345 in the X direction by $\Delta X_1$.

For the above step S2, aligning the fixed holder 320 with the squeegee blade mount 241 is implemented by inserting the fixed holder alignment structure 323 of the fixed holder 320 into the squeegee blade mount alignment structure 313 of the squeegee blade mount 241.

For the above step S4, aligning the support table 170 with the stencil 130 is implemented, for example, by the imaging system 180 shown in FIG. 1.

In addition, the above step S2 may be a manual adjustment step (by operating the driving member 356) or an automatic adjustment step.

After the above steps, the squeegee blade 244, the stencil 130 and the substrate 210 are aligned with one another. Therefore, corresponding to the same printing position on the substrate 210, the edge portion 344 of the squeegee blade 244 is complementary in shape to the three-dimensional screen 232. For example, a protrusion of the edge portion 344 is aligned with a recess of the three-dimensional screen, and the shape of the three-dimensional screen 232 is the same as that of the printing surface of the substrate 210 (for example, both are protrusions). As a result, desired three-dimensional printing can be implemented.

Since the stencil printer of the present disclosure is provided with a fixed holder and a movable holder, during the alignment of the squeegee blade 244, the stencil 130 and the substrate 210, it is only necessary to move the movable holder relative to the fixed holder.

Therefore, the stencil printer of the present disclosure enables convenient alignment adjustment with a simple structure.

Although the present disclosure is described with reference to the examples of the embodiments outlined above, various alternatives, modifications, variations, improvements and/or substantial equivalents, which are known or to be anticipated at present or before long may be obvious to those of at least ordinary skill in the art. Furthermore, the technical effects and/or technical problems described in this description are exemplary rather than limiting. Therefore, the disclosure in this description may be used to solve other technical problems and have other technical effects and/or may solve other technical problems. Accordingly, the examples of the embodiments of the present disclosure as set forth above are intended to be illustrative rather than limiting. Various changes can be made without departing from the spirit or scope of the present disclosure. Therefore, the present disclosure is intended to embrace all known or earlier disclosed alternatives, modifications, variations, improvements and/or substantial equivalents. CLAIMS

The invention claimed is:

1. A stencil printer for printing a viscous substance onto a substrate, the stencil printer comprising:

a frame;

a stencil connected to the frame;

a support table connected to the frame, the support table being configured to support the substrate in a printing position, and the support table being provided below the stencil;

a squeegee blade mount connected to the frame, the squeegee blade mount being provided above the stencil;

a squeegee blade extending in an X direction and performing a squeegeeing operation in a Y direction perpendicular to the X direction;

a squeegee blade holder comprising a fixed holder and a movable holder, the fixed holder being fixedly mounted to the squeegee blade mount, and the squeegee blade being held on the movable holder, wherein the movable holder is configured to be movably connected to the fixed holder in the X direction to enable the squeegee blade to move relative to the support table in the X direction, so that the squeegee blade is adjustable in the X direction to a position aligned with the support table and the stencil; and an adjusting means mounted to the fixed holder and configured to drive the movable holder to move relative to the fixed holder in a first movement direction and in a second movement direction opposite to the first movement direction, wherein the first movement direction and the second movement direction are in the X direction, the adjustment means including a driving member comprising a handle and a push rod connected to the handle, the push rod abutting against the movable holder, and the driving member being configured to drive the push rod to move in the first movement direction relative to the fixed holder by operation of the handle, so as to push the movable holder to move in the first movement direction relative to the fixed holder; and a restoring member being clamped between the movable holder and the fixed holder, the restoring member being configured to accumulate a restoring force during the movement of the movable holder in the first movement direction, and to drive the movable holder to move in the second movement direction by means of the restoring force.

2. The stencil printer according to claim 1, wherein the driving member is threadedly connected to the fixed holder via the push rod.

3. The stencil printer according to claim 2, wherein the driving member and the fixed holder are provided with measuring features capable of measuring a movement distance of the push rod.

4. The stencil printer according to claim 2, wherein the fixed holder comprises a fixed holder body and a first support block and a second support block which are respectively provided at two opposite ends of the top of the fixed holder body, and the movable holder comprises a movable holder body and a first retaining arm and a second retaining arm which are respectively provided at two opposite ends of the movable holder body; and wherein the driving member is mounted to the first support block and abuts against the first retaining arm, and the restoring member is clamped between the second support block and the second retaining arm.

5. The stencil printer according to claim 4, wherein the first support block comprises a first support block body and a connecting cylinder, wherein the connecting cylinder is provided on a side of the first support block body away from the second support block, and the push rod of the driving member is threadedly connected to the connecting cylinder and passes through the first support block body.

6. The stencil printer according to claim 1, wherein the restoring member is a spring.

7. An alignment method for a stencil printer for aligning the squeegee blade, the stencil and the substrate as claimed in claim 1, the method comprising the steps as follows:

S1: determining an offset $\Delta X_1$ of the squeegee blade mount relative to the support table in the X direction;

S2: mounting the fixed holder to the squeegee blade mount after aligning the fixed holder with the squeegee blade mount, and offsetting the fixed holder relative to the movable holder in the X direction by $\Delta X_1$ to initially align the squeegee blade with the support table;

S3: loading the substrate onto the support table at a predetermined position at which the substrate is aligned with the support table;

S4: moving the support table to align the support table with the stencil, wherein the support table is moved by a distance of $\Delta X_2$ in the X direction; and S5: moving the movable holder in the X direction relative to the fixed holder by $\Delta X_2$ to finally align the squeegee blade with the support table and the stencil.

8. The alignment method according to claim 7, wherein the step S3 may precede the step S1 or S2.

9. A stencil printer for printing a viscous substance onto a substrate, the stencil printer comprising:

a frame;

a stencil connected to the frame;

a support table connected to the frame, the support table being configured to support the substrate in a printing position, and the support table being provided below the stencil;

a squeegee blade mount connected to the frame, the squeegee blade mount being provided above the stencil;

a squeegee blade extending in an X direction and performing a squeegeeing operation in a Y direction perpendicular to the X direction; and a squeegee blade holder comprising a fixed holder and a movable holder, the fixed holder being fixedly mounted to the squeegee blade mount, and the squeegee blade being held on the movable holder, wherein the movable holder is configured to be movably connected to the fixed holder in the X direction to enable the squeegee blade to move relative to the support table in the X direction, so that the squeegee blade is adjustable in the X direction to a position aligned with the support table and the stencil, wherein the fixed holder is provided with at least one connecting groove extending in the X direction, and the movable holder is connected to the fixed holder via at least one fastener passing through the at least one connecting groove, wherein the at least one fastener is movable in the X direction along the at least one connecting groove.

10. A stencil printer for printing a viscous substance onto a substrate, the stencil printer comprising:

a frame;

a stencil connected to the frame;

a support table connected to the frame, the support table being configured to support the substrate in a printing position, and the support table being provided below the stencil;

a squeegee blade mount connected to the frame, the squeegee blade mount being provided above the stencil;

a squeegee blade extending in an X direction and performing a squeegeeing operation in a Y direction perpendicular to the X direction; and a squeegee blade holder comprising a fixed holder and a movable holder, the fixed holder being fixedly mounted to the squeegee blade mount, and the squeegee blade being held on the movable holder, wherein the movable holder is configured to be movably connected to the fixed holder in the X direction to enable the squeegee blade to move relative to the support table in the X direction, so that the squeegee blade is adjustable in the X direction to a position aligned with the support table and the stencil, wherein the fixed holder is provided with a fixed holder alignment reference feature, the movable holder is provided with a movable holder alignment reference feature, and a position of the fixed holder alignment reference feature and the movable holder alignment reference feature relative to each other determines an offset of the fixed holder and the movable holder relative to each other.

11. A stencil printer for printing a viscous substance onto a substrate, the stencil printer comprising:

a frame;

a stencil connected to the frame;

a support table connected to the frame, the support table being configured to support the substrate in a printing position, and the support table being provided below the stencil;

a squeegee blade mount connected to the frame, the squeegee blade mount being provided above the stencil;

a squeegee blade extending in an X direction and performing a squeegeeing operation in a Y direction perpendicular to the X direction; and a squeegee blade holder comprising a fixed holder and a movable holder, the fixed holder being fixedly mounted to the squeegee blade mount, and the squeegee blade being held on the movable holder, wherein the movable holder is configured to be movably connected to the fixed holder in the X direction to enable the squeegee blade to move relative to the support table in the X direction, so that the squeegee blade is adjustable in the X direction to a position aligned with the support table and the stencil, wherein the squeegee blade mount is provided with a squeegee blade mount alignment structure, the fixed holder is provided with a fixed holder alignment structure, and the squeegee blade mount alignment structure cooperates with the fixed holder alignment structure to align the squeegee blade mount with the fixed holder.

* * * * *